United States Patent Office 3,211,260
Patented Oct. 12, 1965

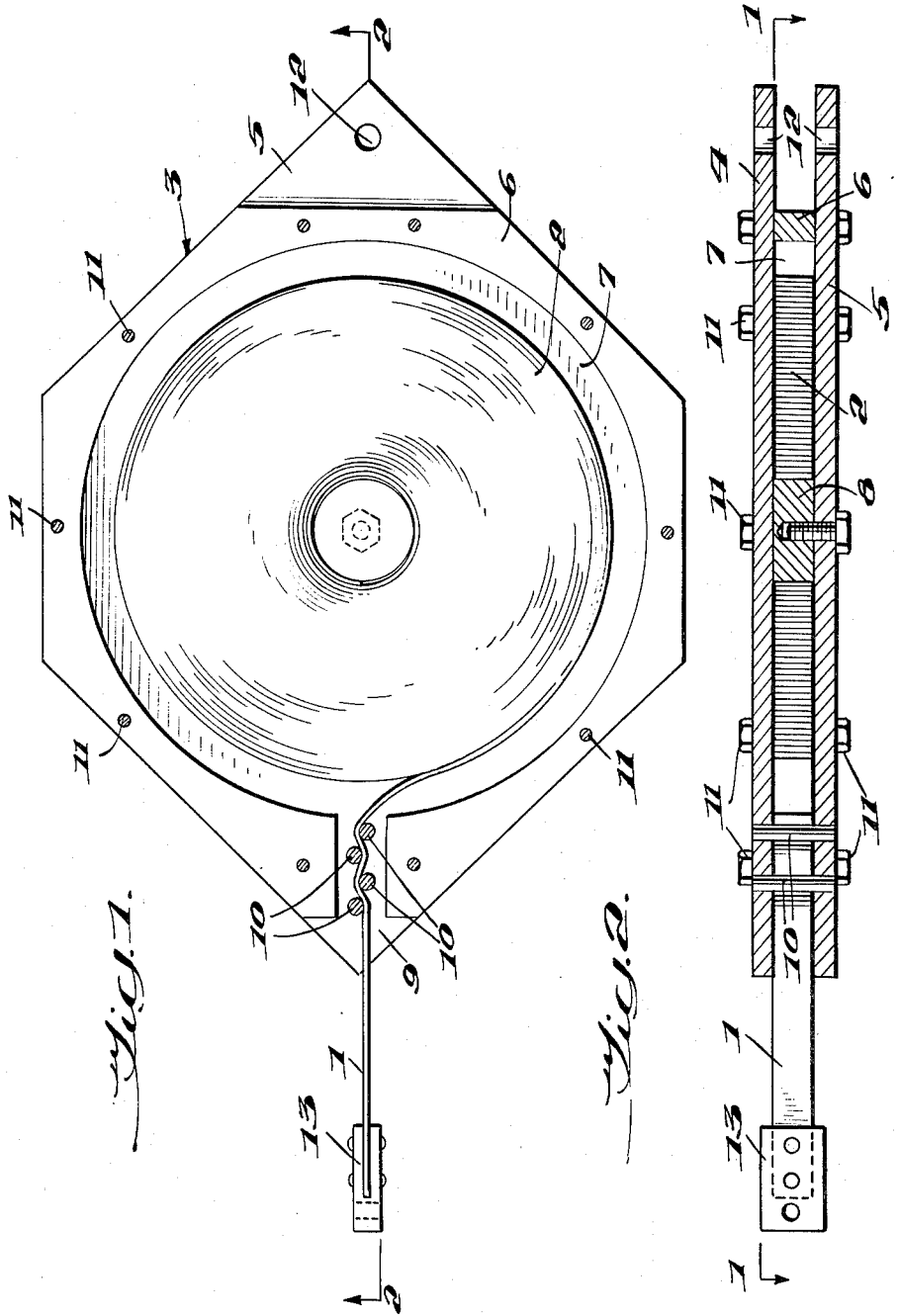

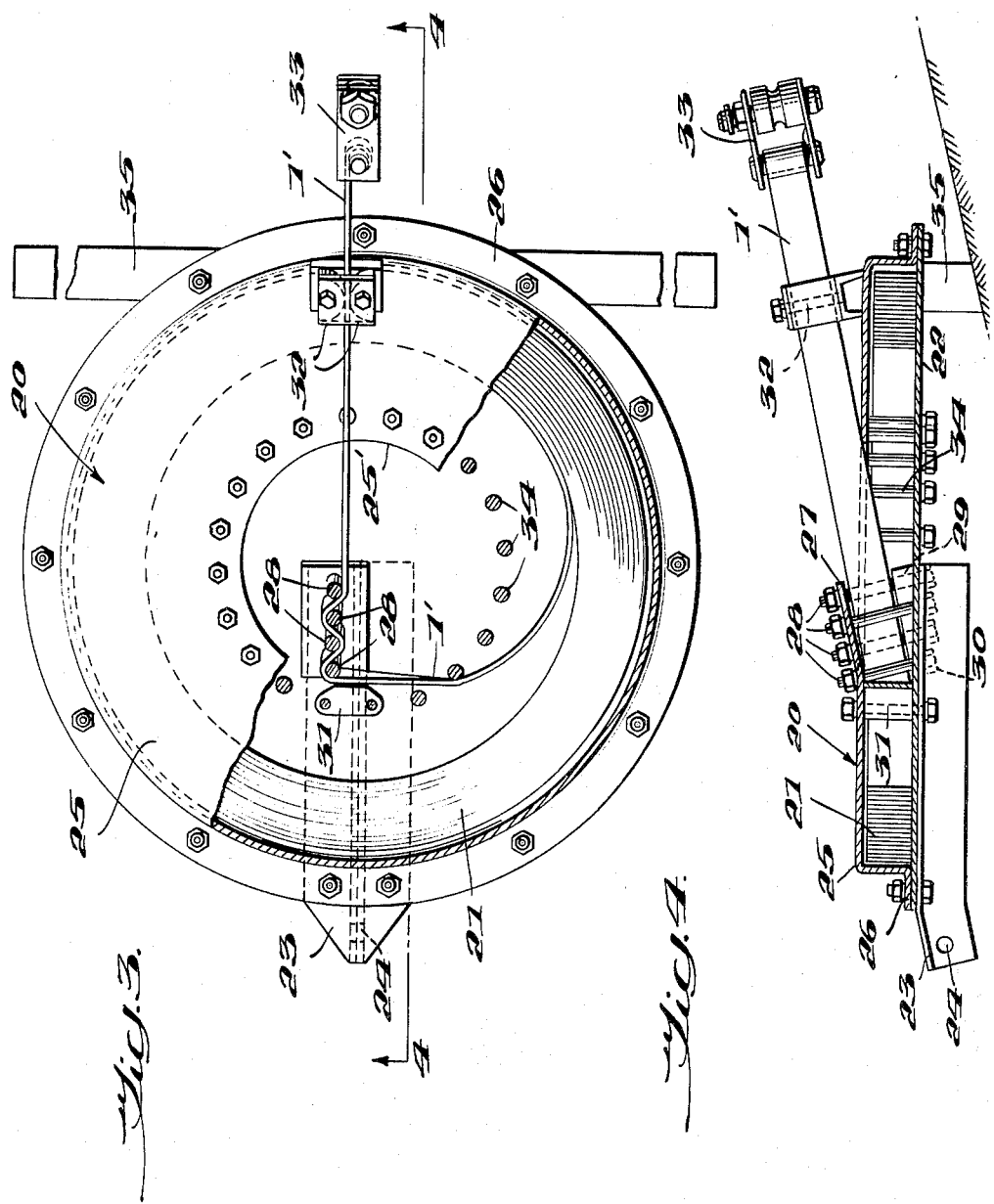

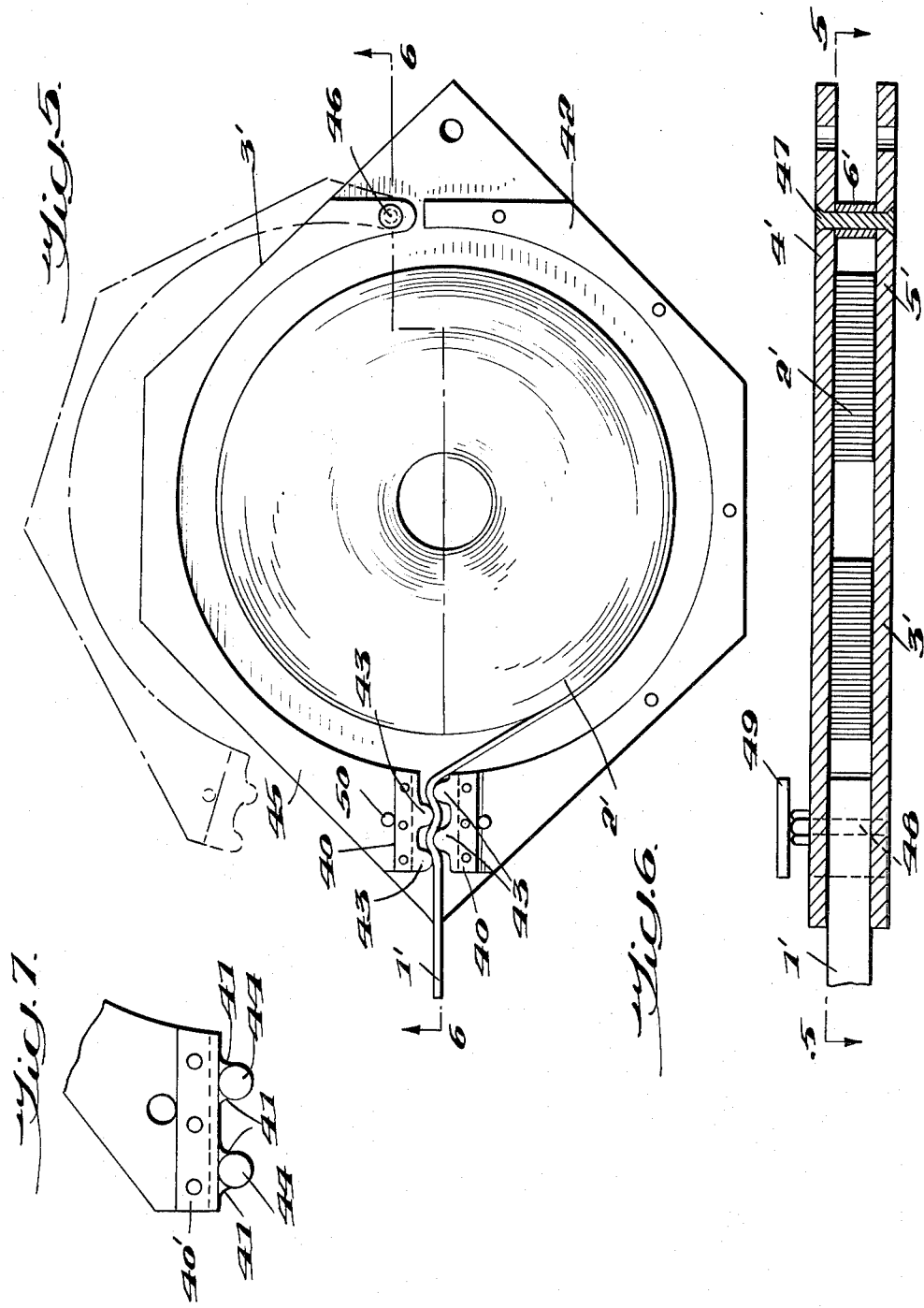

3,211,260
ENERGY ABSORPTION DEVICE
Martin A. Jackson, Bradshaw, Md., assignor to van Zelm Associates Inc., Baltimore, Md., a corporation of Maryland
Filed July 21, 1964, Ser. No. 384,203
2 Claims. (Cl. 188—1)

This invention relates to an energy absorber unit, more particularly one of the so-called "peg type," used as an energy absorber arresting gear in equipment for which there are many applications.

This application is a continuation-in-part of my co-pending application Serial No. 166,066, filed January 15, 1962 now abandoned.

Arresting gear are known, (see U.S. Patents, 2,979,163; 2,980,213; and 3,017,163) in which a strap, rod or filament of metal (hereinafter referred to as a metal element) is coiled and placed within a container and either the outside end of the coil, for low velocity energy absorption where the inertia of the coil is not a factor, or the inside end of the coil, where a high speed arrestment is desired and the inertia of the coil is a factor, is passed over and under a series of rollers which deform the metal element beyond the elastic limit, whereby a retarding force is obtained proportional to the number of reverse bends in the metal element. A substantially constant retarding force can thus be obtained on any force tending to pull the metal element from the reel over the series of rollers. In such applications, the rollers are mounted on bearings so that there is no friction between the rollers and the metal element, but merely a succession of deformations of increments of the metal element beyond the elastic limit, which absorbs or dissipates the energy exerted on the metal element. Patent No. 2,578,903 also shows that rollers are employed with metal straps in the prior art.

This invention is an improvement over those types in which rollers are employed, inasmuch as it dispenses entirely with the rollers or any moving parts which may require maintenance or lubrication other than the relative movement of the metal element with respect to the housing, thus affording a very inexpensive construction, requiring no maintenance.

It is an object of the present invention to provide an energy absorption unit in which energy is absorbed by a metal element passing between a series of stationary pegs or spaced cylindrically faced protuberance over which a metal element is successively and progressively bent beyond the elastic limit of the metal to afford an energy absorbing unit, but in which the metal element is coated with a metal or a metal alloy which will adhere to the metal element, as it is drawn over the stationary pegs or peg-like structures. The metal or metal alloy coating between the metal of the metal element and the steel pegs or peg-like structures functions as a lubricant, but the metal or metal alloy adheres to the metal element under the reverse bending, heat and tension involved in dissipation of the energy.

It is another object of this invention to provide an energy absorption unit in which steel peg-like members are spaced and offset so that a metal element will pass alternately around the faces of successive members, thus causing in the metal element, a succession of reverse bending beyond the elastic limit, but in which the metal element is permitted to pass freely between the members by reason of a soft metal coating which acts as a lubricant under the reverse bend tension load and heat generated during the energy absorption process.

Further and other objects will become apparent from the description of the accompanying drawings in which like numerals refer to like parts.

FIG. 1 is a section taken on the line 1—1 of FIG. 2;
FIG. 2 is a section taken on the line 2—2 of FIG. 1;
FIG. 3 is a plan view partly in section, showing the tape with arresting gear being taken from the inside of the coil of tape; and
FIG. 4 is a section taken on the line 4—4 of FIG. 3;
FIG. 5 is a plan view with one side removed, taken along the line 5—5 of FIG. 6;
FIG. 6 is a section taken on the line 6—6 of FIG. 5;
FIG. 7 is an enlarged view of another form of the spaced metal element deforming protuberances or peg-like members.

There are many applications for this type of arresting gear wherein it is desired to have the unit ever ready as a safety measure, capable of absorbing the kinetic energy of a dynamic load, at any time, over long periods of time without maintenance. Such a unit shown in FIGS. 1 and 2 has extensive application in highway safety where it is desired to stop a vehicle, or have the vehicle engage a barrier, such as a chain link fence, and have it yield under the momentum of the vehicle until the momentum of the vehicle is absorbed by one or more units such as shown in FIGS. 1 and 2, and ultimately brought to rest. such an arrangement of chain link fence and energy absorber units on each end of the fence can be used as guard rails or a road barrier for a safety measure for the casual road traveler or it can be used in police work where it is desired to arrest a speeding vehicle with minimum damage to the vehicle.

In highway guard-rail applications, where the motion of the vehicle is within normal speed limits, the paying out of the metal element is not such that the inertia of the metal element causes any problem. The momentum of the load to be stopped is usually sufficiently slow in paying out the metal element that the inertia of the coil will not snap the metal element in the process.

However, where a higher speed may be encountered, an arrangement such as FIGS. 3 and 4 may be employed, wherein the metal element can be payed out at a higher speed with the same degree of energy absorption without danger of snapping the metal element due to the inertia of the reel. This will be described later in greater detail.

The energy absorbing unit as shown in FIGS. 1 and 2 consists of a metal element 1 coiled in a coil 2 and placed within a container 3. The metal element is usually a ferrous metal and may be of such cross-section as to be rod-like in shape or any cross-sectional shape forming a filament of metal that can be coiled and placed within a container. In this description the term metal element has been employed to mean steel strap, steel rod or any filament of steel or other metal which can be reversely bent to a degree exceeding the elastic limit, thereby absorbing energy by the bending of the metal. The container or housing 3 consists of a pair of plates 4 and 5 separated by a spacer 6. Spacer 6 is formed with a central chamber 7 generally circular in cross-section, to receive a coil of the metal element. A central locator or plug 8 is secured to one plate 5 and extends through spacer 6 and is of the same height so that it contacts the other plate 4. Spacer member 6 is continuous except for a passage 9 leading outwardly from chamber 7 formed within the spacer 6 between the plates 4–5. In passage 9 are placed a row of steel or any hard metal pegs 10, which are spaced longitudinally of the passage and the sides contacted by the metal element are offset from the center line of the passage.

The spacing and offset of the sides of pegs 10 engaging the metal element is sufficient to bend the material of the metal element an amount in excess of the elastic limit and by the successive bending over the outer surfaces of a number of pegs, or over the longitudinal edges of peg-like members, a predetermined retarding force is exerted on any effort to pull the metal element between the pegs and out of the chamber formed within the container. Pegs 10 may be firmly secured in one side of plate 4 or 5 and extend into apertures in the other side plate for rigid support of each end of pegs 10. Pegs 10 are stationary and do not rotate. Suitable fastening means, such as bolts 11, are employed to hold the two side plates 4–5 and the spacer 6 assembled after the insertion of the metal element 1 in the chamber 7.

The aligned holes 12 are formed in plates 4–5 to afford fastening means for a U-bolt or other bolt fastening means to secure the unit. The metal element 1 has a suitable fitting 13 on its free end.

In the embodiment shown in FIGS. 3 and 4, energy can be absorbed with less danger of snapping the metal element 1' if the initial velocity of the load is greater. The device consists of a container 20 for a coil 21 of the metal element 1'. Bottom plate 22 has a bracket 23 bolted thereto which has a hole 24 formed therein for a U-bolt or any suitable fastening means. A cover plate 25 is formed to complete the container having a flange 26 to afford means to bolt the cover 25 and bottom plate 22 together. Cover 25 is formed with a central aperture 25' through which metal element 1' is passed from the inside of the coil 21. Cover portion 27 extends into aperture 25' to stabilize the ends of bolts 28. A wedge 29 and wedge washer 30 on each bolt 28 afford a firm mounting for bolts 28 on plate 22 and cover 25.

A guide block 31 assists in aligning metal element 1' with the first of the group of bolts 28. Guide blocks 32 stabilize metal element 1' outside container 20. Fitting 33 on the end of the metal element affords a fastening device for the cable or other means by which a load is arrested. Bolts 34 extend through cover 25 and plate 22 and afford an inner limit and guide for the inner coil toward block 31 and bolts 28. The laterally extending member 35 gives the assembly lateral stability on the ground.

The term "peg" or "peg-like" member as used in the specification and claims, means any peg or rod which is a right circular cylinder or any right cylinder of any cross-section, or any smooth convex surface protruding from a supporting member which interfits with a similar protruding element on another surface. The surface elements of any of the curved surfaces extend transversely of the direction of motion of the metal element.

Pegs or rods may be used when the axial length is relatively small when related to the diameter and tension load in the metal element.

As the axial length increases for a wider metal element, or the tension load increases, the pegs or rods are "backed" or supported against a backing plate 40 as shown in FIGURE 7. The rods or pegs may be welded at 41 to prevent bending under load.

It should be understood that only the outer surfaces of the rods or pegs, or the longitudinal edges of said peg-like members against which the metal element bears, is utilized in the deformation of the metal element. Therefore, any member, the outer surface of which contacts the metal element, and is in the form of a smooth, curved surface so mounted on the support to resist deformation, comes within the meaning of the term "peg-like member" or "peg-like protuberance." Only the longitudinal edges of said protuberances engage the metal element and the outer curved surfaces of members 43, in FIGURE 5, function exactly as do pegs or rods and will deform the metal element and absorb energy therefrom.

FIGURES 5 and 6 show a device similar to that shown in FIGURES 1 and 2 except that the device shown is arranged for quick reloading with a coiled metal element.

The energy absorber unit as shown in FIGURES 5 and 6 consists of a metal element 1' coiled in a coil 2' and placed within a container 3'. The container or housing 3' consists of a pair of plates 4' and 5' separated by a spacer 6'. Spacer 6' is formed in two segments. Segment 42 is secured by suitable fastening means, such as rivets or bolts, to side plates 4' and 5'. The end of segment 42 where metal element 1' emerges has secured thereto metal member 40 on which are secured or formed a plurality of protuberances 43 which are peg-like in form and function. They may be machined or forged and later hardened. They may also be formed as shown in FIGURE 7 by pieces of rod 44 having an axial length equal to the width of the metal element and welded as shown at 41 to metal members 40'.

Segment 45 must be of length to permit a coiled metal element to be inserted in the cavity formed by the side plates 4' and 5' and segment 42. Segment 45 is secured at one end by a pivot 46 in the form of a rivet or bolt 47. Segment 45 is secured in the operative position by a pin 48 at its opposite end, having a handle 49 which permits tightening pin 48 in a threaded hole in plate 5' after it has been placed through a hole in plate 4' and through hole 50 in segment 45.

The function of the peg-like protuberance 43 is the same in function and operation as the pegs shown in FIGURES 1 and 2 or the bolts shown in FIGURES 3 and 4.

In the above described embodiments, the metal element is steel and is coated by processes whereby a softer metal surface is obtained. A suitable process is galvanizing wherein a zinc coating is bonded to the metal element; however any equivalent coating having the properties of zinc coating described herein may be used.

It is understood that certain changes, alterations, modifications, and substitutions can be made, particularly in the softer metal coating on the metal element, without departing from the spirit and scope of the appended claims.

I claim:

1. An energy absorbing device comprising an elongated metal element and a frame means to house said elongated metal element in the form of a coil, said housing comprising side plates, a segmented spacer means between said side plates surrounding said coiled element, one segment of said spacer means secured rigidly to said plates, having one end thereof formed with spaced, convex protuberances perpendicular to the plane of said side plates, another segment of said spacer element pivoted between said side plates and of a length sufficient to permit the insertion of the coiled metal element, the free end of said pivoted segment formed with spaced convex protuberances perpendicular to the plane of said side plates, and spaced to interfit with said convex protuberances on said first mentioned segment, means to secure said pivoted segment in place so that said convex protuberances interfit to engage and bend the free end of said metal element extending from the coil, and means providing a solid metal lubricant on said metal element.

2. A device as in claim 1 wherein the lubricating coating comprises a zinc coating bonded to the metal element.

References Cited by the Examiner

UNITED STATES PATENTS

| | | | |
|---|---|---|---|
| 1,511,264 | 10/24 | Carter | 188—1 X |
| 1,932,454 | 10/33 | Franks. | |
| 2,217,921 | 10/40 | Saukatis | 117—130 X |
| 2,578,903 | 12/51 | Smith | 188—1 |
| 2,979,163 | 4/61 | Van Zelm | 188—1 |

ARTHUR L. LA POINT, *Primary Examiner.*

DUANE A. REGER, *Examiner.*